June 4, 1963 E. BRAUN 3,092,678
APPARATUS FOR GASIFYING LIQUIDS
Filed April 28, 1959 3 Sheets-Sheet 1

INVENTOR.
ERNST BRAUN
BY
Watson, Cole, Grindle & Watson
Attys.

June 4, 1963 E. BRAUN 3,092,678
APPARATUS FOR GASIFYING LIQUIDS
Filed April 28, 1959 3 Sheets-Sheet 2

INVENTOR.
ERNST BRAUN
BY
Watson, Cole, Grindle & Watson
Attys.

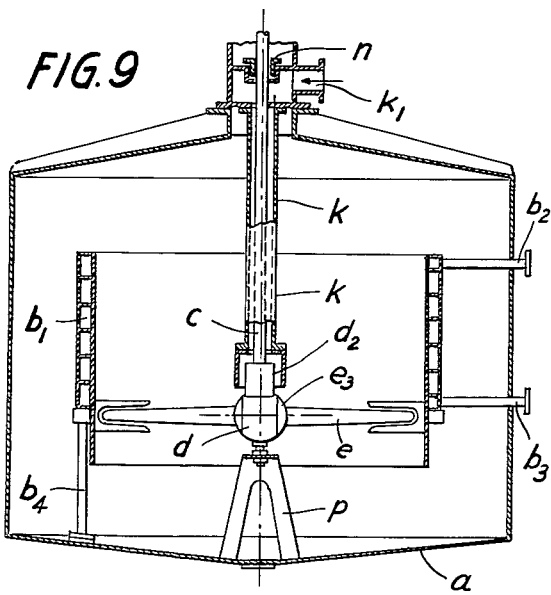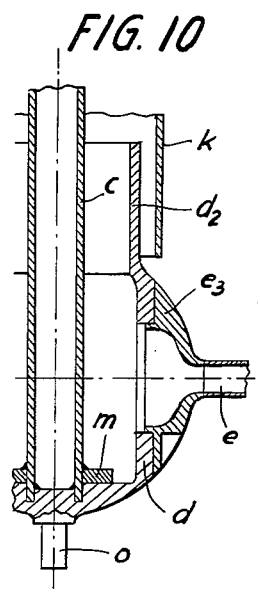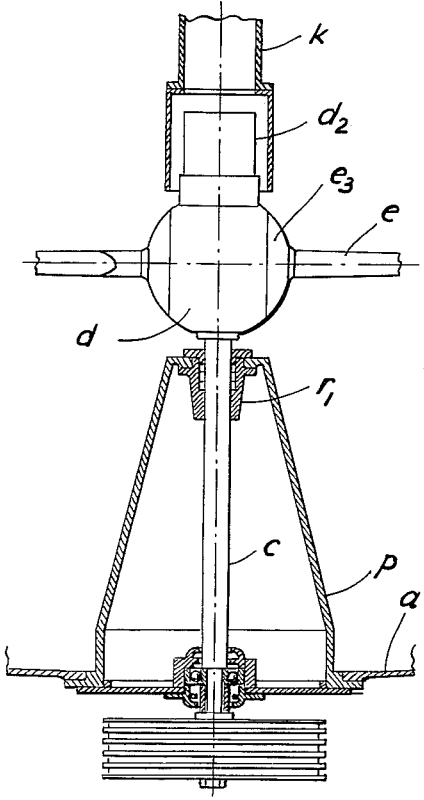

United States Patent Office 3,092,678
Patented June 4, 1963

3,092,678
APPARATUS FOR GASIFYING LIQUIDS
Ernst Braun, Vienna, Austria, assignor to Patentauswertung Vogelbusch Gesellschaft m.b.H., Vienna, Austria
Filed Apr. 28, 1959, Ser. No. 809,512
Claims priority, application Austria Apr. 29, 1958
5 Claims. (Cl. 261—30)

The present invention relates to an apparatus for gasifying liquids, which ensures a very effective exchange of materials between the gas and the liquid with a minimum expenditure of energy. The term "gas" is here intended to signify any gaseous substance, e.g. atmospheric air, carbon dioxide, hydrogen, oxygen etc., but also steam and vapour mixtures, and the "gas" may be charged with solid or liquid particles.

Hitherto, the gas to be distributed was usually introduced near the bottom of the vessel containing the liquid, for example, by means of a system of spray tubes or a hollow body with blades rotating about a vertical axis and provided with outlet openings for the gas.

The above-mentioned gas distributing devices (spray tube systems and rotating blade-like hollow bodies) produce large bubbles as well as small ones. The speed of ascent of the gas bubbles increases with their diameter; the surface available for material exchange increases with the square of the diameter, but the volume increases with the third power of the diameter. Consequently, small bubbles rapidly give up their active substance to the liquid and ascend the remaining part of the liquid column merely as ballast no longer taking part in the exchange of materials. Large bubbles, on the other hand, which ascend rapidly and have a small specific surface area, escape from the surface of the liquid before they have given up even a small proportion of their active substances to the liquid. Both these factors result in only a small proportion of the gas supplied being utilized in the gasifying process.

It is also known to dispose a spray tube system or a rotary distributing device in the form of a perforated tube below or inside a more or less cylindrical hollow body which is open at both ends and which subdivides the vessel containing the liquid into an inner chamber and an outer annular chamber. The gasified liquid in the inner chamber, which has a lower specific gravity, is forced upwards by the heavier liquid from the annular outer chamber, so that a liquid circulation, known as a mammoth pump effect, is thereby established. This apparatus has been proposed for the gasification in the biological purification of waste water, in which the liquid is saturated with the active substance of the gas. The gas bubbles ascending in the liquid leave the surface of the liquid after giving up a portion of their active substances, whereas initially saturated liquid is returned in the circulation, so that after one complete cycle the liquid returns to the gas inlet where the active substances are replenished.

In all these gasifying devices, the exchange of material between the gas and liquid takes place only above the gas distributing device, where the column of liquid is permeated by ascending gas bubbles.

When a large amount of active substance is required, the total cross section of the vessel must be gasified if the liquid column remains substantially at rest. The advantage of the mammoth pump effect, namely that the gas distributing device can be limited to a smaller cross-section area, because the liquid is constantly returned owing to its circulation to the gas supply point, can only be made use of in those cases in which the degree of saturation achieved covers the amount of active substance required during the time the liquid takes to circulate once.

In many cases, in particular in the fermentation of yeast, the consumption of active substances by micro-organisms is so great that the amount required during one circulation is not covered by the amount taken up by the solution, so that in these cases the desired biological process cannot be achieved or at least cannot be achieved in an economically acceptable manner, with the known gasifying apparatus which operates on the mammoth pump principle.

The invention is based on the idea of making use of the above-described mammoth pump effect not only in order to return the liquid in circulation to the point where it is replenished with gas but also in order to enable a high proportion of the gas bubbles to take part in the liquid circulation, so that the gas bubbles can give up their active substances to the liquid during the entire period of circulation. In order to achieve the second aim, it is necessary to increase the mammoth pump effect to such an extent that the speed of circulation of the liquid exceeds the speed of ascent of the above-mentioned proportion of gas bubbles, so that these small gas bubbles are carried along by the circulating liquid during the downward movement and the period of dwell of the above-mentioned gas bubbles is therefore prolonged to the time which they require to circulate through the liquid. A forced mammoth pump action of this kind cannot be achieved with the hitherto customary stationary spray tube systems or the relatively slowly rotating distributing devices in the form of perforated hollow bodies.

The gasifying apparatus according to the invention, in which the gas is supplied to the liquid through a rotary distributing device and the liquid is kept in circulation by a mammoth pump effect is characterized in that the rotating distributing device is in the form of a channel which is open on one side and is set into such rapid rotation that, firstly, the gas supplied through the distributing device builds up a vacuole in the liquid behind the channel, in the tail of which the gas is broken up into large and small bubbles which enter the liquid and secondly, the small bubbles take part in the liquid circulation which is caused by the mammoth pump effect brought about by the large bubbles escaping from the surface of the liquid.

It has been found that by means of a distributing device in the form of a channel which is open on one side, through which gas is supplied and which rotates at sufficiently high speed, a so-called vacuole is formed in the liquid, i.e., a stream-lined, gas filled space which is free from liquid, which vacuole rotates with the channel and is situated behind it, adjacent its concave side. The rear end of this vacuole forms a tail or vortex train in which the gas enters the liquid in the form of coarse and fine bubbles. This breaking up of the gas into coarse and fine bubbles, together with an adequate total quantity of gas, are the prerequisites for satisfactory operation of the apparatus of the invention. The large bubbles, which have a high speed of ascent and therefore permeate the liquid column above the gas distributing device relatively rapidly, and emerge at the surface of the liquid, must be present in such quantity that the mammoth pump effect mentioned above will occur, leading to a relatively high speed of circulation of the liquid. The presence of the large bubbles in sufficient quantity is ensured by using an open gas distributing channel. At the same time, the gas distributing channel must rotate at a sufficiently high speed to ensure that there will also be formed in the tail of the vacuole, bubbles that are so small that their speed of ascent in the liquid will be smaller than the speed of circulation of the liquid. The two last mentioned speeds are additive in the ascending liquid, but in the descending liquid the small bubbles sink at a rate which is equal to the difference between the two speeds, and the time of dwell of the bubbles in the liquid is correspondingly prolonged.

Preferably, the mammoth pump action is so adjusted that the circulation time of the small bubbles is approximately equal to the time in which the gas contained in them is used up, so that the fine bubbles come to be regenerated approximately at the point when they reach exhaustion. Regeneration is effected by absorbing the gas bubbles which have been depleted of active substances in a vacuole which is supplied with fresh gas.

Alternatively, the used up gas bubbles may simply be removed directly from the liquid. For this purpose, the liquid is kept in rotation below the rotating distributing device, so that the used up small bubbles present there are forced inwards by the centrifugal action of the liquid and coalesce to form large bubbles which can easily be removed from the liquid.

To carry out the invention, an apparatus is used in which the vessel containing the liquid to be gasified contains a hollow body which is open at both ends and determines the path of flow of the liquid, as well as a rotary gas distributing device, the rotary gas distributing device being formed by channels open at one side and preferably arranged in the form of a number of blades.

When such a channel open on one side is rotated with increasing speed, it can be observed, for example by using a stroboscopic method, that when a certain speed of rotation is reached, a vacuole is formed behind the channel. At first, only the ascending liquid is gasified. As the speed of rotation is further increased, gas bubbles are also formed which are so small that their speed of ascent is less than the speed at which the liquid circulates as a result of the mammoth pump action, so that these small bubbles take part in the circulation. The onset of the circulation of the small gas bubbles and hence the transition to the operation of the invention is detectable optically. The condition of the fine bubbles after a complete circulation can be determined by analyzing gas samples taken from below the rotary gas distributing channel. By altering the width of the channel (shadow surface), and the level of the rotating channel and its speed of rotation, the mammoth pump effect can be so adjusted that the greater part of the circulating gas bubbles complete their circulation just at the moment when they are exhausted of active substance, as may be detected by analysis.

To influence the course of flow of the liquid, fixed guide devices may be arranged in the path of flow of the liquid, before and/or behind the rotary gas distributing device.

In cases where the depleted gas bubbles are to be separated from the liquid in the manner described above with the aid of centrifugal force, it is advisable to promote this action by arranging a stirrer before the rotary gas distributing device in the path of flow of the liquid. The gas distributing device and the stirrer may be mounted on the same drive shaft.

An outlet is arranged in the middle zone of the path of flow of the liquid, in front of the rotary gas distributing device, for the used up gas bubbles which have coalesced owing to the centrifugal action of the liquid. This outlet for the used up gas is suitably in the form of a hollow body which rotates at a considerably higher speed than the gas distributing device and communicates with a hollow drive shaft which serves as a gas discharge pipe. The hollow drive shaft of the gas distributing device can pass through the top of the vessel and the hollow drive shaft of the hollow gas discharging body can pass through the bottom of the vessel.

The large supply of gas required by the invention, for the rotary gas distributing requires the use of relatively wide supply tubes. If the hollow drive shaft of the gas distributing device is used for the supply of gas, it must have a large diameter, which gives rise to difficulties in sealing this rotary tube, in view of the high speed of rotation of the gas distributing device. In order to obviate these difficulties, and according to a further feature of the invention, a fixed gas supply tube is used, which projects into the gasifying vessel from the top almost down to the hollow hub of the rotary gas distributing device, and the hollow hub is provided with a short tube which opens into it and which projects with some clearance into the fixed gas supply pipe. A hydraulic seal is then formed by the liquid between the connecting tube, which rotates with the hollow hub, and the fixed gas inlet pipe.

The hollow hub of the gas distributing device is preferably spherical on the outside to avoid the occurrence of turbulence during rotation.

As very concentrated mashes can be treated by the apparatus of the invention and in the production of yeast, large quantitites of heat are produced. In order to conduct away this heat, the hollow body in the gasifying vessel, which is open at the top and bottom, and which conducts the circulatory flow, is preferably constructed as a cooler, e.g. in the form of a coiled cooling tube.

Apparatus suitable for carrying out the invention are illustrated, diagrammatically and by way of example, in the accompanying drawings, in which:

FIGURE 1 is an axial section through the first embodiment;

FIGURES 2 and 3 are cross-sections on the lines 2—2 and 3—3 respectively of FIGURE 1 in the direction of the arrows;

FIGURE 9 is a part sectional view of an apparatus having improved means for the gas supply and cooling;

FIGURE 10 shows a detail of the apparatus of FIGURE 9 in cross-section, and finally FIGURE 11 is a vertical sectional view of a detail of a further form of construction of the apparatus in which the same principle is used for the gas supply as is used in the apparatus shown in FIGURE 9.

Figure 1:
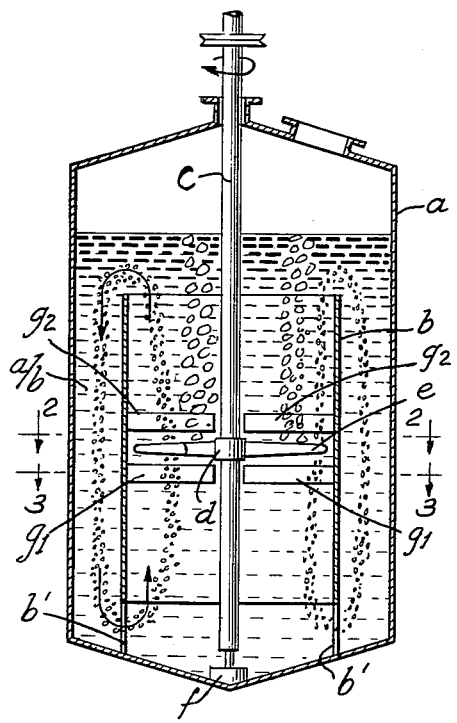

In all the forms of apparatus illustrated, a vessel $a$ which contains the liquid to be gasified is divided into two concentric compartments by a central cylinder or tube $b$ which extends, for example, to the bottom of the vessel $a$ and is provided with openings $b_1$ at its lower end. A hollow shaft $c$, which is mounted in a bearing $f$ and is rotated by any suitable means, is disposed within the central cylinder $b$. Also within the tube $b$ is a gas distributing device $e$ in the form of a channel which is open on one side and may consist, for example, of two blades of semi-circular cross-section. Gas is supplied to the distributing device $e$ from the hollow shaft $c$ through a hub $d$. Behind this rotating channel there is formed a vacuole which rotates with the channel and is filled with gas but is free from liquid. At the surface of contact of the vacuole with the surrounding liquid the gas supplied is dispersed by eddy effect and this dispersion of the gas leads to the introduction of coarse and fine bubbles into the liquid, particularly at the tail of the eddy which follows the vacuole.

The liquid in the cylinder $b$ above the gas distributing device $e$ is consequently permeated with coarse and fine gas bubbles and owing to its content of large gas bubbles has a lower specific gravity than the liquid in the annular space $a/b$ of the vessel which, as will be hereinafter explained, only contains fine bubbles. Owing to the difference in specific gravity a mammoth pump effect is produced, the consequence of which is that the liquid is caused to circulate in the direction indicated by the arrows in FIGURE 1. The circulatory movement of the liquid which takes place effects a separation at the surface of the liquid of the gas bubbles into those which rise at a greater speed and into those which rise at a less speed than the speed of circulation of the liquid.

The large gas bubbles, the formation of which cannot be avoided and the effectivness of which for the gasifying process is small, are given off above the surface of the liquid. Consequently, these gas bubbles are used mainly for producing the mammoth pump effect, so that the work of compression and distribution which is expended on their production is not lost but is used for circulating the liquid.

The finer gas bubbles, which rise at a lower speed than the speed of circulation of the liquid, are carried along by the stream of liquid in the outer annular space $a/b$ towards the bottom of the vessel. Their absolute speed is equal to the speed of circulation of the liquid minus the rising speed of the bubbles. The result of this is that these finer bubbles have a long dwell within the liquid. The period of dwell is inversely proportional to the diameter of the bubbles so that a thorough utilization of bubbles of all sizes is ensured in the gasification apparatus. After the liquid-gas mixture has passed through the outer annular space $a/b$ downwardly towards the bottom it passes through the openings $b_1$ in the central cylinder $b$ into the cylinder $b$. The liquid which now carries with it gas bubbles which have been depleted in active substances, again rises upwardly in the central cylinder $b$.

The gas bubbles which have been depleted as active substances are either regenerated or are separated and replaced by freshly formed bubbles.

Figure 2:
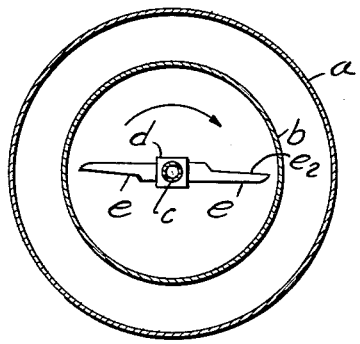
Figure 3:
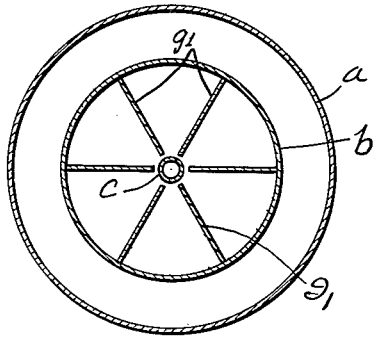

The apparatus shown in FIGURES 1–3 operates in accordance with the regeneration process. In this case, fixed blades $g_1$ and $g_2$ which extend radially inwards from the cylinder $b$ are provided above and below the rotating gas distributing channel $e$. The blades $g_1$ and $g_2$ prevent the liquid in the cylinder $b$ from being rotated except in the immediate vicinity of the channel $e$. The gas-liquid mixture, therefore, rises upwardly in the central cylinder $b$ until it arrives in the region of the rotating gas distributing channel $e$. In the plane of rotation of the channel $e$, or of the vacuole which rotates with it, the exhausted bubbles are taken up in the vacuole and an equalization in concentration between exhausted and freshly supplied gas takes place. The described cycle of operations is repeated with gas bubbles regenerated in this way.

Figure 4:
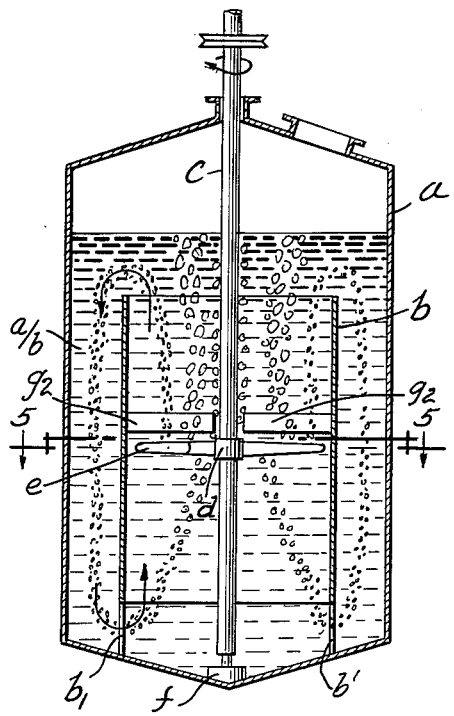
FIGURE 4 is an axial section through a form of apparatus in which the consumed gas is conducted to the outside by centrifugal action of the liquid rotating below the gas distributing body.
Figure 5:
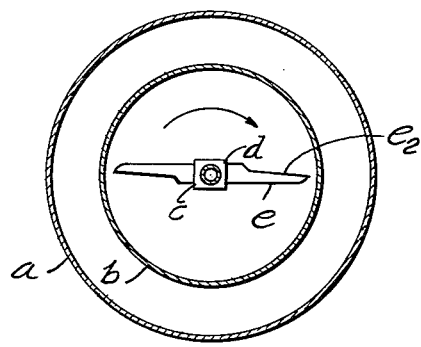
FIGURE 5 is a cross-section on the line 5—5 of FIGURE 4 in the direction of the arrows.

When the gas bubbles which have been exhausted or depleted in active substances are to be removed from the liquid and a fresh gasification is to take place, the central cylinder $b$, as shown in FIGURE 4, is not provided with retarding blades below the rotating gas distributing channel $e$. The liquid in the central cylinder $b$ is then also set in rotation by the rotation of the channel $e$. The effect of the rotation of the liquid is that the exhausted gas bubbles are compressed against the hollow shaft $c$ by centrifugal effect and coalesce there to form larger bubbles which then pass along the hollow shaft through the liquid and escape above its surface. A peripheral annular space free from exhausted gas bubbles but filled with rising liquid is thereby formed within the central cylinder $b$. This annular space is supplied with fresh gas bubbles by the vacuoles of the distributing channel $e$. In this case the open channel portions $e_2$ of the distributing body $e$ are preferably arranged, as shown in FIGURE 5, only in the vicinity of the wall of the cylinder $b$, in order that the fresh gas may enter substantially into the gas-free ring of liquid.

Figure 6:
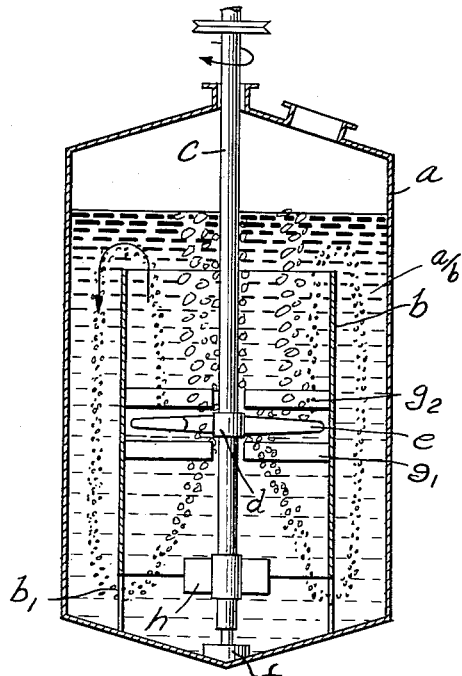
FIGURE 6 is an axial section through an apparatus in which the rotation of the liquid below the gas distributing body is increased by a blade stirrer and the liquid is retarded at the level of the distributing body by guide surfaces.

The centrifugal effect can be increased if, as shown in FIGURE 6, a blade stirrer $h$ is fitted to the hollow shaft $c$ below the rotating gas distributing channel $e$, so that the rotation of the liquid below the channel $e$ takes place more intensively. The retarding devices $g_1$ and $g_2$ retard the rotation of the liquid only in the region of the channel $e$.

Figure 7:
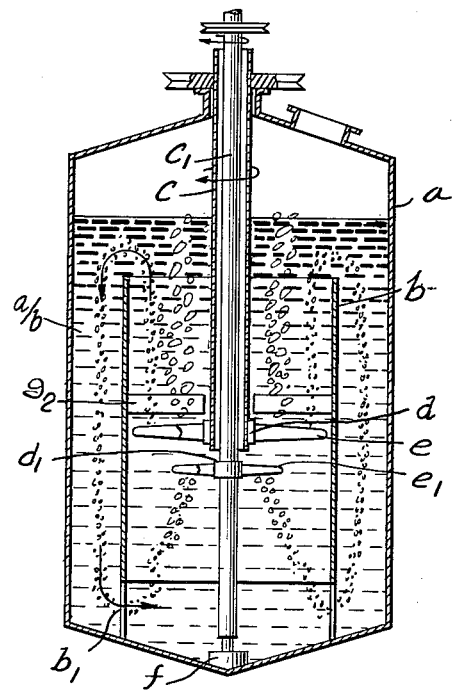
FIGURE 7 is an axial section through an apparatus in which a device for centrifuging and collecting the used up gas and for conducting it to the outside is disposed below the gas distributing body.

The removal of the exhausted gas bubbles can be further promoted, as shown in FIGURE 7, a second rapidly rotating small hollow blade $e_1$, which is driven from the hollow hub $d_1$ of a hollow shaft $c_1$, is arranged below the rotating gas distributing channel $e$. The gas bubbles which are driven into the middle of the vessel by the rotation of the liquid are taken up in the region of the small blade $e_1$ in the vacuole following it. The internal pressure in the vacuole is equal to the static pressure of the liquid reduced by the dynamic pressure resulting from the passage of the rotating blade $e_1$ through the liquid. It is, however, in any case greater than the atmospheric pressure. If the small rotating blade $e_1$ is in communication with the atmosphere through the hollow shaft $c_1$ which is coaxial with the shaft $c$, the gas which is collected and compressed in its vacuole will be delivered to the atmosphere. By suitable arrangement of this auxiliary blade $e_1$ the result can be obtained that only liquid which has been thoroughly freed from exhausted gas bubbles flows to the gas distributing body $e$. Both shafts C and C' are suitably driven by a pulley secured on each shaft.

Figure 8:
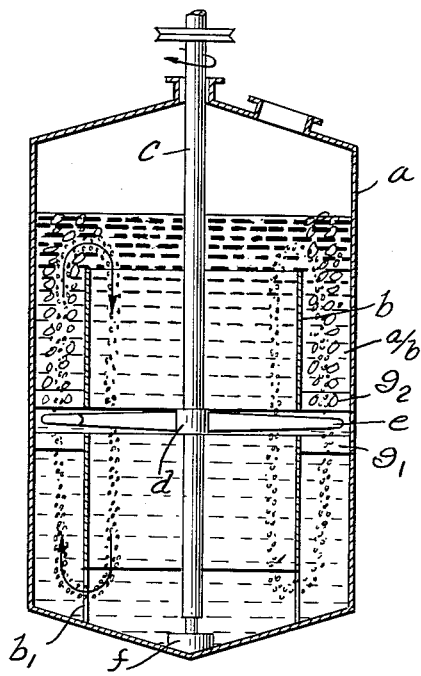
FIGURE 8 is a longitudinal section through an apparatus in which the gas outlet zone of the rotating distributing body is disposed in the concentric outer ring of the vessel.

The principle of the invention is not altered if, as shown in FIGURE 8, the rotating gas distributing channel $e$ is made so large that it extends through the central tube $b$ into the annular space $a/b$ and sweeps through this. In this case, the open channel portions are so arranged that they are situated in the outer annular space and this is, therefore, gasified. The resulting procedure is similar to that previously described, except that the circulation of the liquid, as shown by the arrows in FIGURE 8, takes place in the opposite sense. The retarding blades $g_1$ and $g_2$ extend in this case from the outside of the wall of the cylinder $b$ to the wall of the vessel $a$ and are arranged above and below the gas distributing channel $e$. The large bubbles escape in the annular space $a/b$ above the surface of the liquid.

The rotating gas distributing channel $e$ is preferably arranged only so far below the surface of the liquid that the resulting mammoth pump effect produces an adequate circulation of the liquid. Then the work of compression which has to be expended on the gas is considerably less than with the usual arrangement of the gas distributing device in the vicinity of the bottom of the vessel.

In FIGS. 1, 4, 6 and 8 a pulley may suitably be secured on the shaft C as shown at the top thereof.

In the constructional example shown in FIGURE 9, a stationary gas supply pipe $k$ is used for the gas supply to the rotating gas distributing device $e$ instead of the drive shaft $c$. The gas distributing pipe $k$ extends from above into the gasifying vessel $a$ as far as the vicinity of the hollow hub $d$ of the gas distributing device $e$. The stationary pipe $k$ is closed at the top and is provided with a lateral inlet pipe $k_1$. As will be seen from the section in FIGURE 10, a pipe $d_2$ is connected at the top to the hollow hub $d$ and enters into the lower end of the pipe $k$ which is widened out as shown in FIGURE 10 and spaced apart from it. Since the gas distributing device has to some extent a suction effect, the liquid to be gasified rises somewhat in the interior of the inlet pipe $k$, i.e., in the annular space between the pipes $k$ and $d_2$, and a hydraulic seal for the gas inlet pipe is thereby automatically formed at this place during operation. The gas which flows in through the pipe $k$ can, therefore, enter the liquid only through the rotating gas distributing device $e$. The driving shaft of the rotating gas distributing pipe, which is shown as a hollow shaft but can also be a solid shaft, passes coaxially through the gas distributing pipe $k$ and is fixed at $m$ for example, by welding, to the bottom of the hollow hub $d$. Then, this relatively thin shaft need only be sealed at the top at $n$, for example by means of stuffing boxes. The hub $d$ has at its lower end a bearing member $o$ which is journalled in a socket $p$.

The modified apparatus shown in FIGURE 11 also has a stationary gas supply pipe $k$ which conducts the gas through a pipe $d_2$ to the hollow hub $d$. In this case the distributing pipe $e$ is driven from below. The driving shaft $c$ is journalled in a bracket $p$ and carries a belt pulley at its lower end which passes through the bottom of the vessel $a$ and is sealed by means of stuffing boxes.

The hollow hub $d$ and the fastening flanges $e_3$ for the gas distributing channel $e$ in the constructional examples shown in FIGURES 9–11 are externally of spherical shape in order that the rotation of the hub may produce no eddying effects.

FIGURE 9 shows a further suitable detail in accordance with the invention. In this case, the hollow cylinder which guides the circulatory flow is constructed as a cooler in the form of a cold water coil or duct $b_1$ which is connected to inflow and outflow ducts $b_2$ and $b_3$ and supported on the bottom of the vessel $a$ by supports $b_4$.

The invention is suitable for any type of gasification but is of particular importance for the large scale cultivation of micro-organisms by the supply of oxygen to organisms suspended in a nutrient substrate, e.g. to mashes in the production of yeast. In addition to supplying the substrate with oxygen, the gas bubbles also remove the carbon dioxide which is formed as a metabolic waste product.

To explain the advantages obtainable by the gasifying apparatus of the invention in the field of yeast production, a numerical example of an experiment carried out in accordance with the invention will be described below and compared with a known gasifying device carried out under similar operative conditions.

In a yeast cultivating vat having a diameter of 2.5 m. and a height of 3 m. (gross volume 14.7 m.³) a ring having a diameter of 1.77 m., and a height of 0.8 m. was arranged coaxially with the vat and at a distance of 0.44 m. from the bottom. Inside the ring, at a distance of 0.64 m. from the bottom, there was arranged a gas distributing apparatus according to the invention, which consisted of two channels arranged diametrically opposite one another and open on one side, and having a radial length of 0.8 m. This gas distributing device was rotated at a speed of 240 revolutions per minute (peripheral speed 20 m./sec.). To start fermentation, 1000 kg. starter yeast (calculated with 30% dry substance) was added to the water, so that the total quantity of the starting composition was 6300 litres. During 14 hours of fermentation, 3700 litres of molasses solution, corresponding to 2000 kg. of molasses, were introduced. The growth of yeast resulting from this molasses solution, calculated on yeast having 30% dry weight, amounted to 1700 kg., so that the total yield in yeast was 2700 kg. This yield in yeast corresponded to 270 g. per litre of yeast (having 30% dry weight). The final content of the container was 10,000 litres. The total quantity of air supplied during fermentation was 13,600 Nm.³ with an average compression pressure of 1.022 m. water column.

In comparison with this, a normal, blade-shaped perforated hollow body with a speed of rotation of 138 revs. per minute (peripheral speed 14.5 m./sec.) was used as the gas distributing device in the same container, at a distance of 0.2 m. from the bottom. After 13 hours' fermentation, 1040 litres of molasses solution, corresponding to 400 kg. of molasses, was introduced. The starting yeast amounted to 80 kg. calculated as yeast having 30% dry weight. The increase in yeast of 340 kg. resulting from the molasses solution introduced, together with the starting yeast gave a total yield of yeast of 420 kg. The vat was filled up to the same final volume. The total requirement of air was 2720 Nm.³ at N.Y.P. with an average compression pressure of 1.752 m. water column.

On comparing these two experiments, which were both carried out under optimum operating conditions, it is evident that the apparatus of the invention gave a yield of yeast of 2700 kg. in the same vat after approximately the same fermentation time, compared with a yield of 420 kg. in the known apparatus, and a growth of yeast of 1700 kg. compared with 340 kg. The total power consumption, which is composed of the work required for compression of the gas and the work required for driving the gas distributor, is about 40% less per kg. of newly formed yeast in the apparatus of the invention than in the known process.

It is not possible to make a comparison between the apparatus of the invention and the known process using the mammoth pump action because the latter apparatus cannot be used for the production of yeast. Merely saturating the liquid would not be sufficient to cover the high oxygen requirement of the micro-organisms also in the descending part of the liquid (wort), so that fermentation would set-in in this part.

I claim:
1. An apparatus for gasifying liquids, comprising a vessel for containing the liquid to be gasified, a hollow body open at the top and at the bottom disposed in said vessel so as to subdivide the interior of the vessel into a substantially annular outer space and an inner space, said spaces communicating at the top and the bottom of said hollow body, a gas distributing device rotating about a vertical axis and arranged coaxially with said hollow body, said gas distributing device comprising at least one channel open on one side and having a substantially symmetrical curved cross section with respect to its horizontal plane of rotation, said cross section tapering radially outwardly, means for supplying gas to the gas distributing device and means for rotating it at a speed sufficient to build up a vacuole in the liquid behind the channel, whereby part of the gas entering the liquid from said vacuole causes by mammoth pump effect a circulation of the liquid between the inner and outer spaces of said vessel and the remaining part of the gas entering from said vacuole circulating with the liquid.

2. Apparatus for gasifying liquids, comprising a vessel for containing the liquid to be gasified, an open-ended cylinder disposed vertically and concentrically in said vessel, a drive shaft extending coaxially through said cylinder, a rotatable gas distributing device on said drive shaft, said gas distributing device comprising at least one channel open on one side and having a substantially curved cross section with respect to its horizontal plane of rotation, said cross section tapering radially outwardly, means for supplying gas to the gas distributing device and means for rotating it at a speed sufficient to build up a vacuole in the liquid behind the channel, whereby part of the gas entering the liquid from said vacuole causes by mammoth pump effect a circulation of the liquid between the inner and outer spaces of said vessel and the remaining part of the gas entering from said vacuole circulating with the liquid, and a stirring device on said drive shaft below said distributing device.

3. Apparatus for gasifying liquids, comprising a vessel for containing the liquid to be gasified, an open-ended cylinder disposed vertically and concentrically in said vessel, a drive shaft extending coaxially through said cylinder, a rotatable gas distributing device on said drive shaft, said gas distributing device comprising at least one channel open on one side and having a substantially curved cross section with respect to its horizontal plane of rotation, said cross section tapering radially outwardly, means for supplying gas to the gas distributing device and means for rotating it at a speed sufficient to build up a vacuole in the liquid behind the channel, whereby part of the gas entering the liquid from said vacuole causes by mammoth pump effect a circulation of the liquid between the inner and outer spaces of said vessel and the remaining part of the gast entering from said vacuole circulating with the liquid, and an outlet for exhaust gas arranged in the path of circulation of the liquid before said rotatable distributing device.

4. Apparatus according to claim 3, in which said outlet comprises a hollow second drive shaft, and a hollow body mounted on and communicating with the interior of said second drive shaft, said second drive shaft being rotated at a considerable higher speed than said distributing device.

5. An apparatus for gasifying liquids, comprising a vessel for containing the liquid to be gasified, an open-ended hollow body disposed in said vessel, a rotatable gas distributing device comprising at least one channel open at one side disposed in said vessel, a first hollow drive shaft extending through the top of said vessel on which drive shaft said gas distributing device is mounted, a rotatable hollow body below said gas distributing device, a second hollow drive shaft extending coaxially with said first drive shaft through the top of said vessel on which second shaft said hollow body is mounted, said hollow body communicaing with the interior of said second hollow drive shaft on which it is mounted, and means for rotating said second hollow drive shaft at a substantially higher speed than said gas distributing device.

References Cited in the file of this patent
UNITED STATES PATENTS

| | | |
|---|---|---|
| 1,579,355 | Greenawalt | Apr. 6, 1926 |
| 1,632,758 | Fulweiler et al. | June 14, 1927 |
| 2,041,184 | Isenhour | May 19, 1936 |
| 2,875,897 | Booth | Mar. 3, 1959 |

FOREIGN PATENTS

| | | |
|---|---|---|
| 199,170 | Austria | Aug. 25, 1958 |
| 218,637 | Switzerland | Apr. 16, 1942 |
| 1,021,655 | France | Feb. 23, 1953 |